United States Patent [19]

Yoshizaki

[11] Patent Number: 5,235,956

[45] Date of Patent: Aug. 17, 1993

[54] SECONDARY AIR FEED DEVICE OF AN ENGINE

[75] Inventor: Kouji Yoshizaki, Susono, Japan

[73] Assignee: Toyota Jidosha Kabushiki Kaisha, Aichi, Japan

[21] Appl. No.: 917,220

[22] Filed: Jul. 23, 1992

[30] Foreign Application Priority Data

Aug. 7, 1991 [JP] Japan .................................. 3-198016

[51] Int. Cl.$^5$ .......................................... F02B 23/00
[52] U.S. Cl. ...................................... 123/585; 60/289
[58] Field of Search ............... 123/585, 531, 533, 586, 123/672, 675, 681, 472, 478; 60/276, 608, 599

[56] References Cited

U.S. PATENT DOCUMENTS

| 5,024,201 | 6/1991 | Kobayashi et al. | 123/531 |
| 5,043,899 | 8/1991 | Okada et al. | 123/585 |
| 5,113,651 | 5/1992 | Kotzan et al. | 60/276 |
| 5,119,631 | 6/1992 | Kayanuma et al. | 60/289 |
| 5,148,788 | 9/1992 | Saikalis et al. | 123/585 |
| 5,152,137 | 10/1992 | Nishizawa | 60/276 |
| 5,157,920 | 10/1992 | Nakaniwa | 60/276 |
| 5,168,706 | 12/1992 | Kawamura | 123/585 |

FOREIGN PATENT DOCUMENTS

| 59-138714 | 8/1984 | Japan | 123/585 |
| 60-70713 | 5/1985 | Japan | 123/585 |
| 60-243316 | 12/1985 | Japan | 123/585 |

*Primary Examiner*—Raymond A. Nelli
*Attorney, Agent, or Firm*—Oliff & Berridge

[57] ABSTRACT

A secondary air feeding device comprising an air pump for feeding secondary air into the exhaust passage upstream of the three way catalytic converter. The air-fuel ratio is normally maintained at the stoichiometric air-fuel ratio by a feedback control. When the amount of fuel is to be increased, the feedback control is stopped, and the supply of secondary air is started. At this time, the amount of secondary air is basically calculated from the amount of fuel fed into the engine.

16 Claims, 13 Drawing Sheets

SECONDARY AIR FEED DEVICE OF AN ENGINE

BACKGROUND OF THE INVENTION

1. Field of the Invention

The present invention relates to a secondary air feed device of an engine.

2. Description of the Related Art

In a known engine, to promote the oxidization of unburned HC and CO in the exhaust gas, and thus purify the exhaust gas, secondary air is fed into the exhaust passage of the engine. In this engine, the target amounts of secondary air, which are a function of the engine load and the engine speed, are memorized in advance, and the feeding of secondary air into the exhaust passage is carried out on the basis of the target amounts of secondary air. Further, an oxygen concentration detector is arranged in the exhaust passage, and the amount of secondary air is corrected by a feedback operation, so that the concentration of oxygen in the exhaust passage becomes equal to a predetermined concentration (see Japanese Unexamined Patent Publication No. 59-138714).

Namely, even where the target amounts of secondary air are memorized in advance as a function of the engine load and the engine speed, and the amount of secondary air is determined so that it becomes equal to the target amount, since irregularities in size and shape of parts of the secondary air feeding device exist, the amount of secondary air actually fed into the exhaust passage considerably deviates from the target amount. Particularly when the engine has been used for a long time, and thus an aging deterioration (wear) of the parts has occurred, the amount of such a deviation becomes very large. Accordingly, in this engine, as mentioned above, to correct the deviation of the amount of secondary air actually fed into the exhaust passage, relative to the target amounts of secondary air, the amount of secondary air is feedback-controlled based on the output signal of the oxygen concentration detector.

In such a feedback control, however, the amount of secondary air actually fed is controlled after it has deviated from the target amounts of secondary air, and in addition, since a time delay exists in the secondary air control device, even if the feedback control signal indicating that the amount of secondary air is to be changed is input to the secondary air control device, some time must elapse before the amount of actually fed secondary air is changed. Accordingly, a problem arises in that, even if the amount of secondary air is controlled by such a feedback control operation, it is difficult to maintain the concentration of oxygen in the exhaust passage at a constant value, particularly when the required amount of secondary air is abruptly changed, and further, another problem arises in that the oxygen concentration detector must be arranged in the exhaust passage, to carry out such a feedback control operation.

SUMMARY OF THE INVENTION

An object of the present invention is to provide a secondary air control device capable of correctly maintaining an equivalent air-fuel ratio in the exhaust passage at a predetermined ratio without using an oxygen concentration detector for controlling the secondary air.

According to the present invention, there is provided a device for controlling the operation of an engine having an exhaust passage, the device comprising: a fuel amount calculating means for calculating an amount of fuel to be fed into the engine in accordance with an operating state of the engine; a fuel supply means for feeding fuel into the engine by an amount calculated by the fuel amount calculating means; a secondary air supply means for feeding a secondary air into the exhaust passage; a secondary air amount calculating means for calculating an amount of secondary air on the basis of the amount of fuel calculated by the fuel amount calculating means, to find an amount of secondary air necessary to obtain a predetermined desired equivalent air-fuel ratio on the leaner side of an air-fuel ratio determined by the calculated amount of fuel; and a control means for controlling the secondary air supply means in response to the necessary amount of secondary air found by the secondary air amount calculating means to make the amount of secondary air fed into the exhaust passage equal to the necessary amount of secondary air.

The present invention may be more fully understood from the description of preferred embodiments of the invention set forth below, together with the accompanying drawings.

DESCRIPTION OF THE PREFERRED EMBODIMENTS

Figure 1:
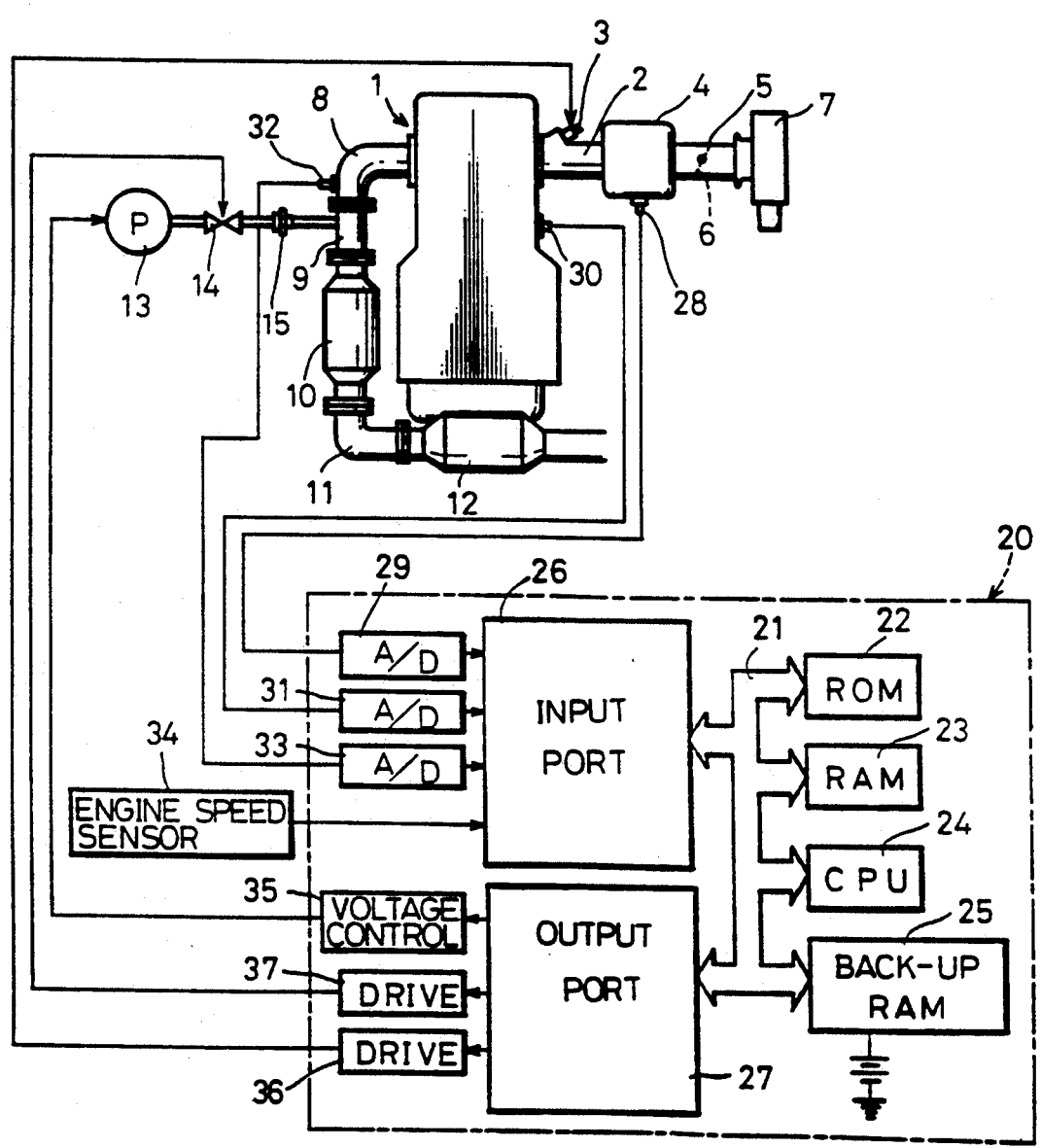
FIG. 1 is a general view of an engine.

Referring to FIG. 1, reference numeral 1 designates an engine body, 2 a branch pipe, 3 a fuel injector mounted on the branch pipe 2, and 4 a surge tank; 5 is an intake duct, 6 a throttle valve, 7 an air cleaner, and 8 an exhaust manifold; 10 designates a first catalytic converter connected to the exhaust manifold 8 via an exhaust pipe 9; 12 is a second catalytic converter connected to the first catalytic converter 10 via an exhaust pipe 11; and 13 is an electrically driven air pump. The discharge side of the air pump 13 is connected to the exhaust pipe 9 via a shut-off valve 14 and a check valve 15. The check valve 15 permits only an inflow of air into the exhaust pipe 9, and accordingly, when the shut-off valve 14 is open, air discharged from the air pump 13, i.e., secondary air, is fed into the exhaust pipe 9. The amount of secondary air discharged from the air pump 13 is controlled by a drive voltage applied to the air pump 13, and this drive voltage is controlled by an electronic control unit 20.

The electronic control unit 20 is constructed as a digital computer, and comprises a ROM (read only memory) 22, a RAM (random access memory) 23, CPU (microprocessor etc.) 24, a back-up RAM 25 continuously connected to the power source, an input port 26, and an output port 27. The ROM 22, the RAM 23, the CPU 24, the back-up RAM 25, the input port 26, and the output port 27 are interconnected via a bidirectional bus 21.

A pressure sensor 28 producing an output voltage proportional to the absolute pressure in the surge tank 4 is arranged in the surge tank 4, and the output voltage of the pressure sensor 28 is input to the input port 26 via an AD converter 29. A temperature sensor 30 producing an output voltage proportional to the temperature of the engine coolant is attached to the engine body 1, and the output voltage of the temperature sensor 30 is input to the input port 26 via an AD converter 31. An oxygen concentration detector (hereinafter referred to as an $O_2$ sensor) 32 producing an output voltage changed in accordance with the concentration of oxygen in the exhaust gas is arranged in the exhaust manifold 8, and the output voltage of the $O_2$ sensor 32 is input to the input port 26 via an AD converter 33. Further, an engine speed sensor 34 producing output pulses representing an engine speed is connected to the input port 26.

The output port 27 is connected to the air pump 13 via a voltage control circuit 35. This voltage control circuit 35 comprises a DC-DC converter producing an output voltage corresponding to the control signal output to the output port 27, on a switching circuit carrying out a duty-control of the ON time on the basis of the control signal output to the output port 27. In either case, the drive voltage corresponding to the control signal output to the output port 27 is applied to the air pump 13. Also, the output port 27 is connected to the fuel injector 3 and the shut-off valve 14 via corresponding drive circuit 36 and 37.

The fuel injection time TAU is calculated based on the following formula.

$$TAU = TP \cdot FAF \cdot (1 + K_4) \cdot (1 + K_1 + K_2 + K_3) \cdot GA$$

where each coefficient represents the following,
TP: basic fuel injection time
FAF: feedback correction coefficient
$K_1$: start enrichment coefficient
$K_2$: warm-up enrichment coefficient
$K_3$: acceleration enrichment coefficient
$K_4$: OTP enrichment coefficient
GA: learning coefficient The basic fuel injection time TP is an injection time necessary for making an air-fuel ratio equal to the stoichiometric air-fuel ratio and obtained by experiment. In the embodiment illustrated in FIG. 1, this basic fuel injection time TP is memorized in the ROM 22 in advance, as a function of the engine speed and the absolute pressure in the surge tank 4.

The start enrichment coefficient $K_1$, for example, is increased when the engine is started, and this coefficient $K_1$ is gradually lowered after the engine is started.

The warm-up enrichment coefficient is, for example, a function of the temperature of the engine coolant, and is increased as the temperature of the engine coolant falls.

The acceleration enrichment coefficient $K_3$ is increased when it is determined from, for example, a change in the absolute pressure in the surge tank 4, that the engine is accelerated.

The OTP enrichment coefficient $K_4$ is increased, for example, when the engine is operating under a heavy load, to prevent an overheating of the catalyzer.

Figure 2:
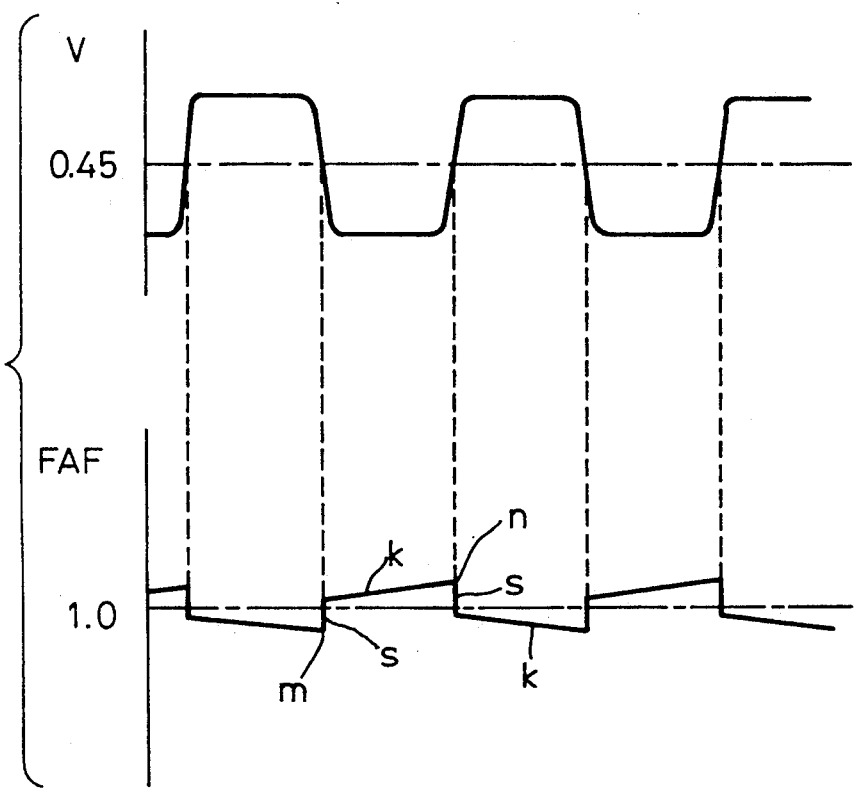
FIG. 2 is a diagram illustrating changes in the output voltage of the $O_2$ sensor and the feedback correction coefficient FAF.

The feedback correction coefficient FAF is changed based on the output voltage of the $O_2$ sensor 32, so that the air-fuel ratio becomes equal to the stoichiometric air-fuel ratio. Namely, as illustrated in FIG. 2, the $O_2$ sensor 32 produces an output voltage of about 0.1 volt when the air-fuel ratio is on the lean side of the stoichiometric air-fuel ratio, and the $O_2$ sensor 32 produces an output voltage of about 0.9 volts when the air-fuel ratio is on the rich side of the stoichiometric air-fuel ratio. The output voltage of the $O_2$ sensor 32 is compared with a reference voltage of about 0.45 volts. At this time, if $V < 0.45(V)$, i.e., the air-fuel mixture is lean, the feedback correction coefficient FAF is abruptly increased by a fixed skip value S, and thereafter, is gradually increased by a fixed integration constant K. Conversely, if $V > 0.45(V)$, i.e., the air-fuel mixture is rich, the feedback correction coefficient FAF is abruptly lowered by a fixed skip value S, and thereafter, is gradually lowered by a fixed integration constant K. Note that the mean value $(m+n)/2$ of a pair of successive values m and n of FAF, obtained immediately before FAF is changed by a skip amount, is continuously calculated. This mean value represents the mean value FAFAV of the feedback control coefficient FAF.

The learning coefficient GA causes the feedback correction coefficient FAF fluctuate around 1.0, at all times, as illustrated in FIG. 2, and the above-mentioned FAFAV is used as the learning coefficient GA. For example, when the vehicle is driven in a high altitude location, the density of the air becomes low. At this time, if the fuel injection is carried out based on the basic fuel injection time TP, the air-fuel mixture becomes rich, and thus the feedback correction coefficient FAF and the mean value FAFAV thereof become low. In this case, if the value of GA is made equal to FAFAV, the value of FAF is maintained at about 1.0.

The feedback control of air-fuel ratio based on the feedback correction coefficient FAF is carried out, for example, when the enrichment operation is not carried out, i.e., when the enrichment coefficients $K_1$, $K_2$, $K_3$ and $K_4$ are equal to zero. At this time, the feedback correction coefficient FAF fluctuates around 1.0, and the air-fuel ratio is maintained at the stoichiometric air-fuel ratio. When the fuel amount is to be increased, the required valves are added to the necessary enrichment coefficients $K_1$, $K_2$, $K_3$, $K_4$. Since the air-fuel ratio is maintained at the stoichiometric air-fuel ratio when $FAF=1.0$, when the required values are added to the necessary enrichment coefficients $K_1$, $K_2$, $K_3$, $K_4$, the air-fuel ratio is deviated from the stoichiometric air-fuel ratio by an air-fuel ratio corresponding to the increase in the enrichment coefficients $K_1$, $K_2$, $K_3$, $K_4$. Accordingly, it is possible to determine the actual air-fuel ratio from the increase in the enrichment coefficients $K_1$, $K_2$, $K_3$, $K_4$.

Next, the amount of secondary air to be fed into the exhaust passage by the air pump 13 will be described.

If all of the enrichment coefficients $K_1$, $K_2$, $K_3$ and $K_4$ are represented by a single enrichment coefficient K, the above-mentioned fuel injection time TAU can be represented by the following formula.

$$TAU = TP \cdot FAF \cdot K \cdot GA$$

$$K = (1+K_4) \cdot (1+K_1+K_2+K_3)$$

It is well known that the stoichiometric air-fuel ratio (the amount of air/the amount of injected fuel) is approximately equal to 14.5. Also, when FAF=1.0 and K=1, the air-fuel ratio is maintained at the stoichiometric air-fuel ratio, and accordingly, at this time the amount of air $Q_a$ fed into the engine cylinder is represented by the following formula.

Amount of air $Q_a$ = Amount of injected fuel $$TAU \cdot 14.5 = TP \cdot GA \cdot 14.5$$

Conversely, when the amount of fuel is increased, the amount of injected fuel TAU becomes K times the amount of fuel injected when the air-fuel ratio is equal to the stoichiometric air-fuel ratio. Accordingly, at this time, to maintain the air-fuel ratio at the stoichiometric air-fuel ratio, an amount of air that is K times the amount of air fed when the air-fuel ratio is maintained at the stoichiometric air-fuel ratio is required. Accordingly, at this time, the required amount of air $Q_b$ is represented by the following formula.

$$\begin{aligned} Q_b &= \text{Amount of injected fuel } TAU \cdot K \cdot 14.5 \\ &= TP \cdot K \cdot GA \cdot 14.5 \end{aligned}$$

Accordingly, the amount of air Q required to make the air-fuel ratio equal to the stoichiometric air-fuel ratio can be represented by the following formula.

$$Q = Q_b - Q_a = TP \cdot K \cdot GA \cdot 14.5 - TP \cdot GA \cdot 14.5 = TP \cdot (K-1) \cdot GA \cdot 14.5$$

Here, considering a given point in the exhaust passage, and considering the total amount of air fed into the intake passage and the exhaust passage upstream of the given point, and the total amount of fuel fed in the intake passage and the exhaust passage upstream of the given point, where a ratio of such a total amount of air to such a total amount of fuel is defined as an equivalent air-fuel ratio $(A/F)_0$, if the above-mentioned required amount of air Q is fed into the exhaust passage as secondary air, the equivalent air-fuel ratio $(A/F)_0$ becomes equal to the stoichiometric air-fuel ratio.

Where a three-way catalyzer is used as the catalyzers of the catalytic converters 10 and 12, the purifying efficiency of the exhaust gas by the catalytic converters 10 and 12 is at a maximum when the equivalent air-fuel ratio $(A/F)_0$ is equal to the stoichiometric air-fuel ratio. Accordingly, where the three-way catalyzer is used as catalyzers of the catalytic converters 10 and 12, if the above-mentioned required amount of air Q is fed into the exhaust passage as secondary air, a desired purifying of the exhaust gas can be obtained. Note, in this case, if K=1, i.e., the increase of the amount of fuel is not carried out, the above-mentioned required amount of air Q becomes equal to zero, and thus the supply of secondary air is stopped.

Conversely, where an oxidizing catalyzer is used as the catalyzers of the catalytic converters 10 and 12, the equivalent air-fuel ratio $(A/F)_0$ must be made on the lean side of the stoichiometric air-fuel ratio. In this case, if the equivalent air-fuel ratio $(A/F)_0$ considerably deviates toward the lean side of the stoichiometric air-fuel ratio, since the temperature of the catalyzer drops, and further, the amount of NOx is increased, the equivalent air-fuel mixture must be maintained at a fixed value of about 15.0. In this case, the formula for calculating the amount of secondary air Q is different from the above described formula.

Namely, as apparent from the above explanation, the amount of air $Q_2$ fed into the engine cylinder is represented by the following formula.

$$Q_a = TP \cdot TA \cdot 14.5$$

Conversely, the amount of air $Q_b$ required to make the equivalent air-fuel ratio $(A/F)_0$ equal to the stoichiometric air-fuel ratio is represented by the following formula.

$$Q_b = TP \cdot K \cdot GA \cdot (A/F)_0$$

Accordingly, in this case, the amount of secondary air Q required to obtain the equivalent air-fuel ratio $(A/F)_0$ is represented by the following formula.

$$Q = Q_b - Q_a = TP \cdot K \cdot GA \cdot (A/G)_0 - TP \cdot GK \cdot 14.5 = TP \cdot GA \cdot [K \cdot (A/F)_0 - 14.5]$$

As mentioned above, the amount of secondary air discharged from the air pump 13 is controlled by the drive voltage applied to the air pump 13. Accordingly, if the drive voltage for the air pump 13 is controlled so that the amount of secondary air discharged from the air pump 13 becomes equal to the amount of secondary air Q calculated in the above-mentioned manner, in the method of controlling the supply of secondary air according to the present invention it is possible to control the equivalent air-fuel ratio $(A/F)_0$ so that it becomes equal to a desired air-fuel ratio.

Figure 3:
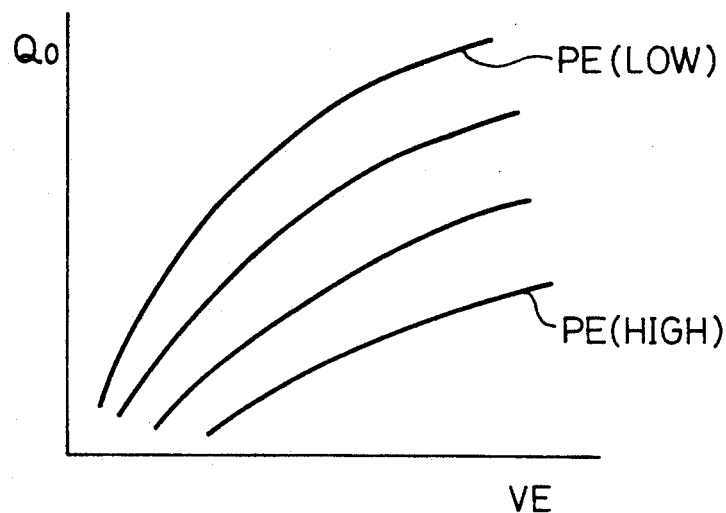
FIG. 3 is a diagram illustrating the amount of secondary air actually fed into the exhaust passage.
Figure 4:
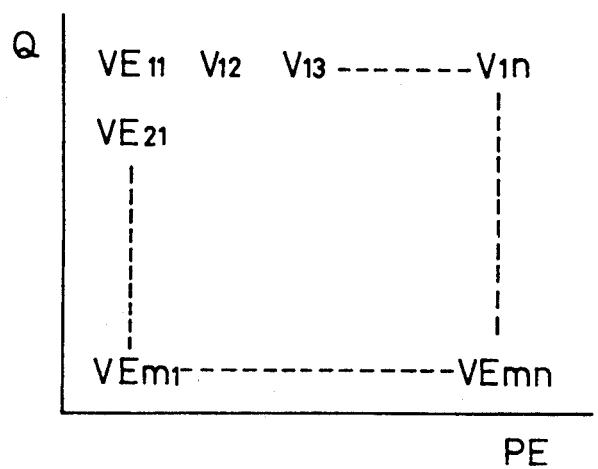
FIG. 4 is a view illustrating a map of the drive voltage for the air pump.

As mentioned above, the equivalent air-fuel ratio $(A/F)_0$ can be controlled so that it becomes equal to a desired air-fuel ratio, by controlling the drive voltage for the air pump 13. In this case, the pressure in the exhaust passage, i.e., the back pressure, has an influence on the amount of secondary air actually fed into the exhaust passage by the air pump 13. Accordingly, to further precisely control the amount of secondary air, preferably the back pressure is taken into consideration. FIG. 4 illustrates the relationship between the back pressure PE, the drive voltage VE for the air pump 13, and the amount of secondary air $Q_0$ actually fed into the exhaust passage. As illustrated in FIG. 3, if the back pressure PE is fixed, the amount of secondary air $Q_0$ is increased as the drive voltage VE becomes high. Nevertheless, even if the drive voltage VE is maintained constant, if the back pressure PE becomes high, the amount of secondary air $Q_0$ actually fed into the exhaust passage is reduced. The relationship between the amount of secondary air $Q_0$, the drive voltage VE, and the back pressure PE can be obtained in advance by experiment. Accordingly, in the embodiment according to the present invention, the drive voltage VE required to make the actual amount of secondary air $Q_0$ equal to the calculated amount of secondary air Q is memorized in advance in the ROM 22, in the form of the map illustrated in FIG. 4, as a function of the back pressure PE and the calculated amount of secondary air Q, and the drive voltage VE is calculated from this map.

Figure 5:
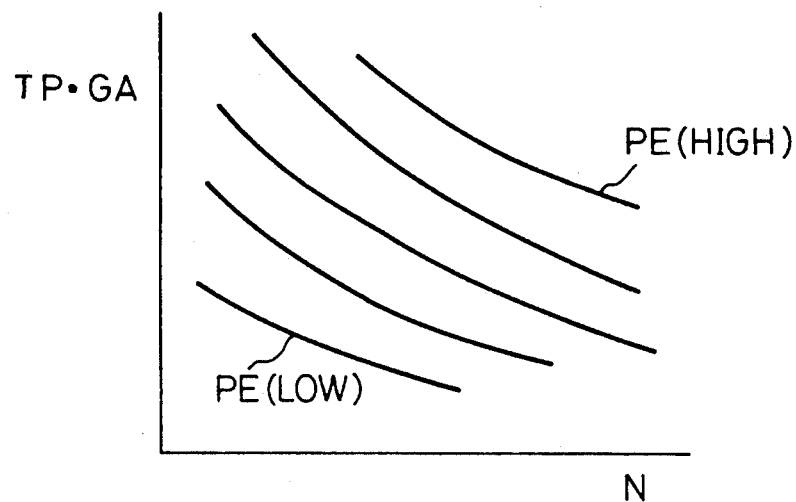
FIG. 5 is a diagram illustrating the back pressure.

As mentioned above, the amount of air $Q_a$ fed into the engine cylinder is represented by TP·GA·14.5, and thus is proportional to TP·GA. If TP·GA is used as the amount of air fed into the engine cylinder, the back pressure PE can be represented as a function of the engine speed N and the amount of air TP·GA fed into the engine cylinder as illustrated in FIG. 5. Namely, as can be seen from FIG. 5, the back pressure PE becomes higher as the amount of air TP·GA is increased, and the back pressure PE becomes higher as the engine speed N becomes higher. Accordingly, the back pressure PE can be calculated from the engine speed N and the amount of air TP·GA. Of course, the back pressure PE can be detected by arranging a back pressure sensor in the exhaust passage, but where such a back pressure sensor is not used, the back pressure PE is memorized in advance in the ROM 22 in the form of the map as illustrated in FIG. 6, as a function of the engine speed N and the amount of air TP·GA, and the back pressure PE is calculated from this map.

Figure 6:
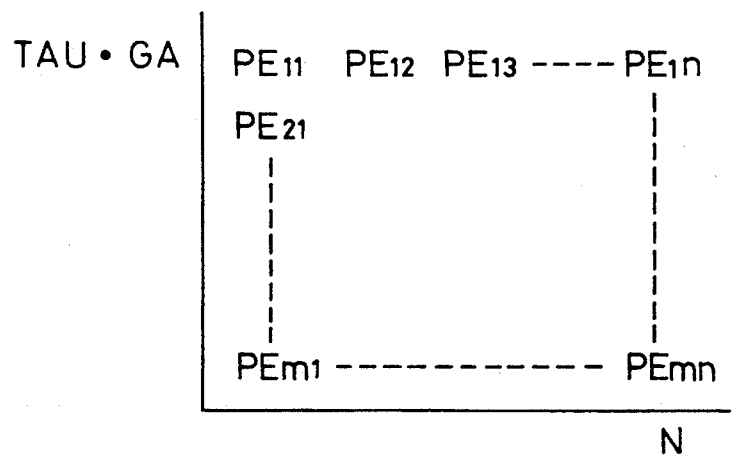
FIG. 6 is a view illustrating a map of the back pressure.
Figure 7A:
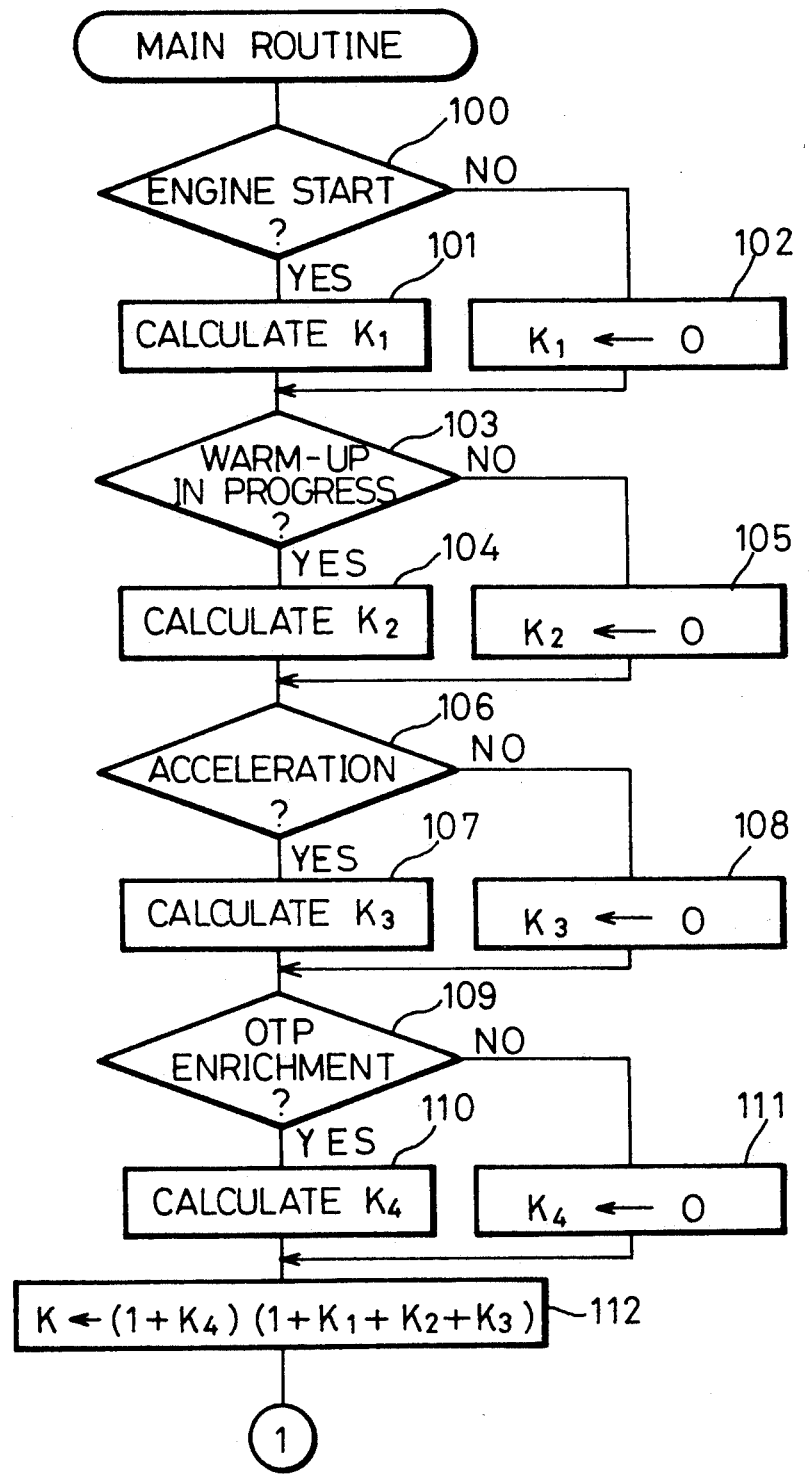
FIGS. 7A and 7B are a flow chart of a main routine.
Figure 7B:
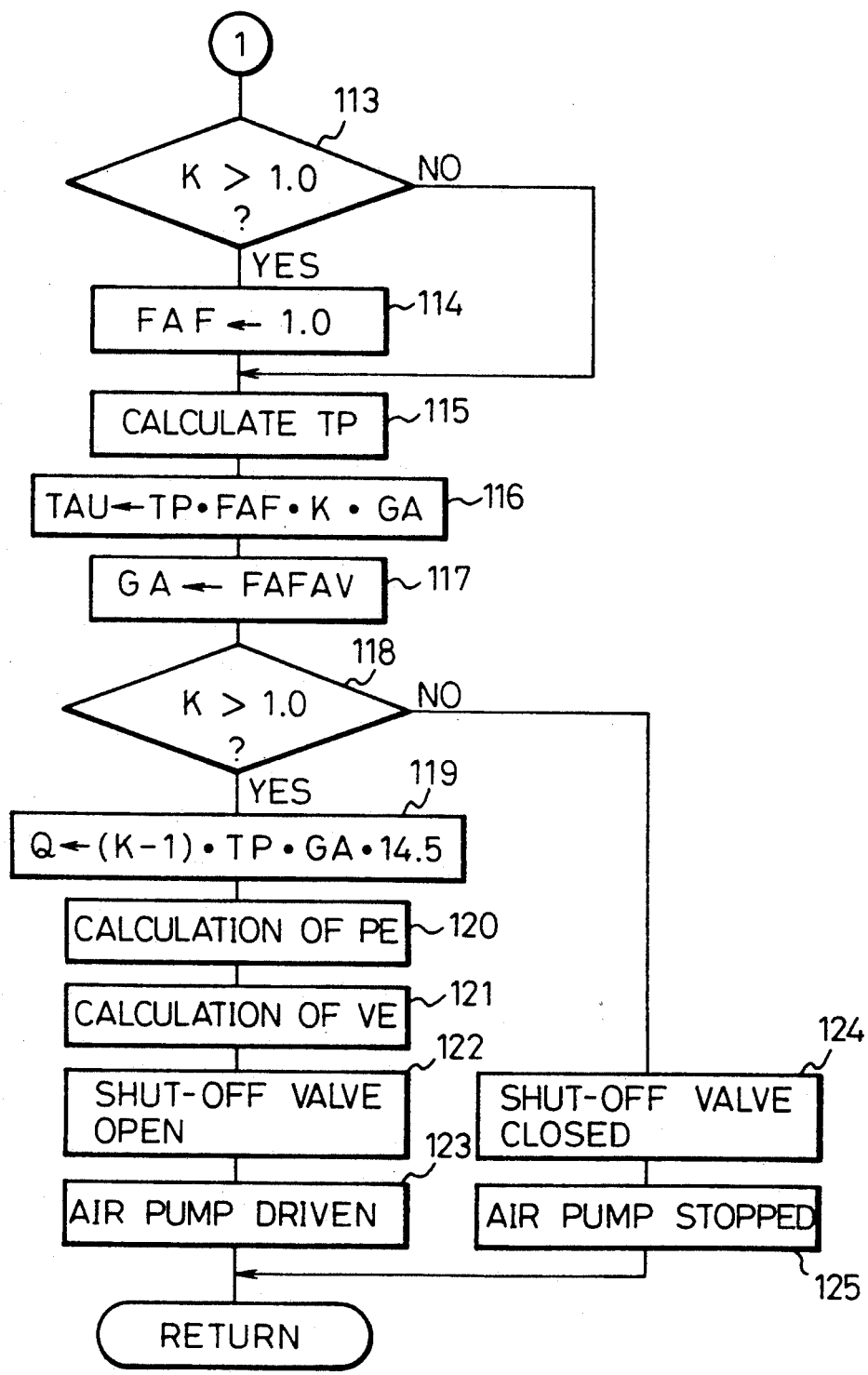

FIGS. 7A and 7B illustrate a main routine used where the engine illustrated in FIG. 1 is used; a three-way catalyzer is used as the catalyzers of the catalytic converters 10 and 12; the back pressure PE is calculated from the map illustrated in FIG. 6; and the amount of secondary air is controlled so that the equivalent air-fuel ratio $(A/F)_0$ becomes equal to the stoichiometric air-fuel ratio when an increase of the fuel amount is carried out.

Referring to FIGS. 7A and 7B, in step 100, it is determined whether or not the engine is being started. If the engine is being started, the routine goes to step 101, and the start enrichment coefficient $K_1$ (>0) is calculated, and then the routine goes to step 103. Conversely, if the engine is not being started, the routine goes to step 102, and the start enrichment coefficient $K_1$ is made zero, and then the routine goes to step 103.

In step 103, it is determined whether or not a warm-up of the engine is in progress. If a warm-up of the engine is in progress, the routine goes to step 104 and the warm-up enrichment coefficient $K_2$ (>0) is calculated, and then the routine goes to step 106. Conversely, if the warm-up of the engine is finished, the routine goes to step 105 and the warm-up enrichment coefficient $K_2$ is made zero, and then the routine goes to step 106.

In step 106, it is determined whether or not an acceleration of the engine is underway. If an acceleration of the engine is underway, the routine goes to step 107 and the acceleration enrichment coefficient $K_3$ (>0) is calculated, and then the routine goes to step 109. Conversely, if an acceleration of the engine is not underway, the routine goes to step 108 and the acceleration enrichment coefficient $K_3$ is made zero, and then the routine goes to step 109.

In step 109, it is determined whether or not the OTP fuel amount increase operation is to be carried out. If the OTP fuel amount increase is to be carried out, the routine goes to step 110 and the OTP enrichment coefficient $K_4$ (>0) is calculated, and then the routine goes to step 112. Conversely, if the OTP fuel amount increase operation is not to be carried out, the routine goes to step 111 and the OTP enrichment coefficient $K_4$ is made zero, and then the routine goes to step 112.

In step 112, the enrichment coefficient K is calculated from the following formula.

$$K=(1+K_4)\cdot(1+K_1+K_2+K_3)$$

Then, in step 113, it is determined whether or not the enrichment coefficient K is larger than 1.0, i.e., the fuel amount increase operation is being carried out. If the fuel amount increase operation is being carried out, the routine goes to step 114 and the feedback correction coefficient FAF is made 1.0, i.e., is fixed, and then the routine goes to step 115. Accordingly, at this time, an open loop control of the air-fuel ratio is carried out. Conversely, if it is determined in step 113 that the fuel amount increase operation is not being carried out, the routine jumps to step 115. Accordingly, at this time, a feedback control of the air-fuel ratio based on the output signal of the $O_2$ sensor 38 is carried out, to maintain the air-fuel ratio at the stoichiometric air-fuel ratio.

In step 115, the basic fuel injection time TP is calculated based on the engine speed N and the output voltage of the pressure sensor 28. Then, in step 116, the fuel injection time TAU is calculated from the following formula.

$$TAU=TP\cdot FAF\cdot K\cdot GA$$

If the fuel injection time TAU is calculated, fuel is injected by the fuel injector 3 on the basis of the fuel injection time TAU. Then, in step 117, the mean value FAFAV of the feedback correction coefficient FAF is made the learning coefficient GA, and then the routine goes to step 118.

In step 118, it is again determined whether or not the enrichment coefficient K is larger than 1.0, i.e., the fuel amount increase operation is being carried out. If the fuel amount increase operation is being carried out, the routine goes to step 119 and the amount of secondary air Q is calculated from the following formula.

$$Q=(K-1)\cdot TP\cdot GA\cdot 14.5$$

Then, in step 120, the back pressure PE is calculated from the map illustrated in FIG. 6, and in step 121, the drive voltage VE for the air pump 13 is calculated from the map illustrated in FIG. 4. Then, in step 122, the shut-off valve 14 is opened, and in step 123, a signal representing the drive voltage VE is input to the voltage control circuit 35, and thus the air pump 13 is driven based on the drive voltage VE.

Conversely, if it is determined in step 118 that the fuel amount increase operation is not being carried out, the routine goes to step 124 and the shut-off valve 14 is closed. Then, in step 125, the air pump 13 is stopped.

Figure 8:
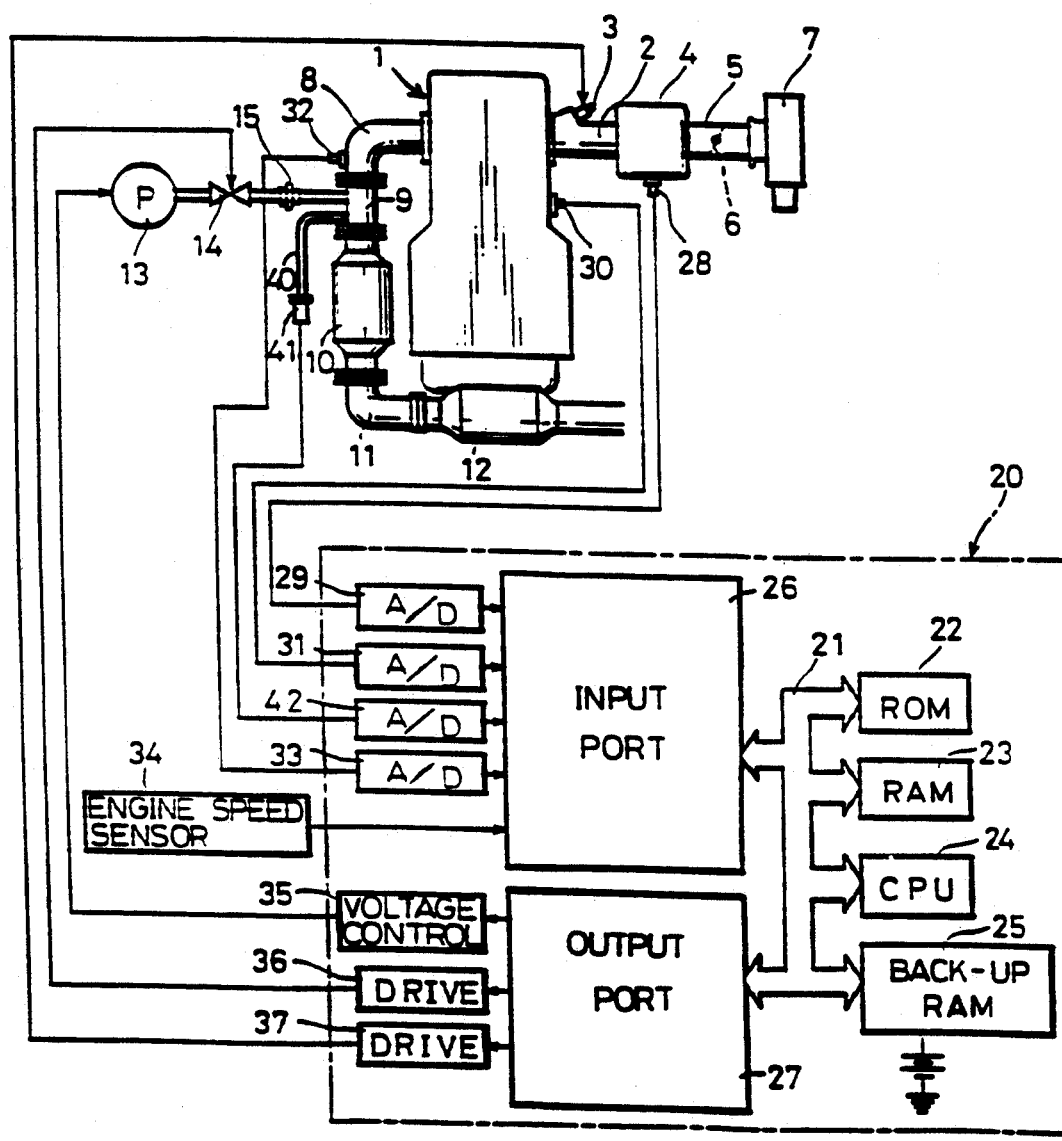
FIG. 8 is a general view of a second embodiment of an engine.

FIG. 8 illustrates a second embodiment of the present invention, wherein similar components are indicated by the same reference numerals as used in FIG. 1.

In this second embodiment, a back pressure sensor 41 is connected to the exhaust pipe via a conduit 40, and this back pressure sensor 41 produces an output voltage proportional to the back pressure in the exhaust pipe 9, and this output voltage is input to the input port 26 via an AD converter 42. Further, in the second embodiment, an oxidizing catalyzer is used as the catalyzers of the catalytic converters 10 and 12.

Figure 9A:
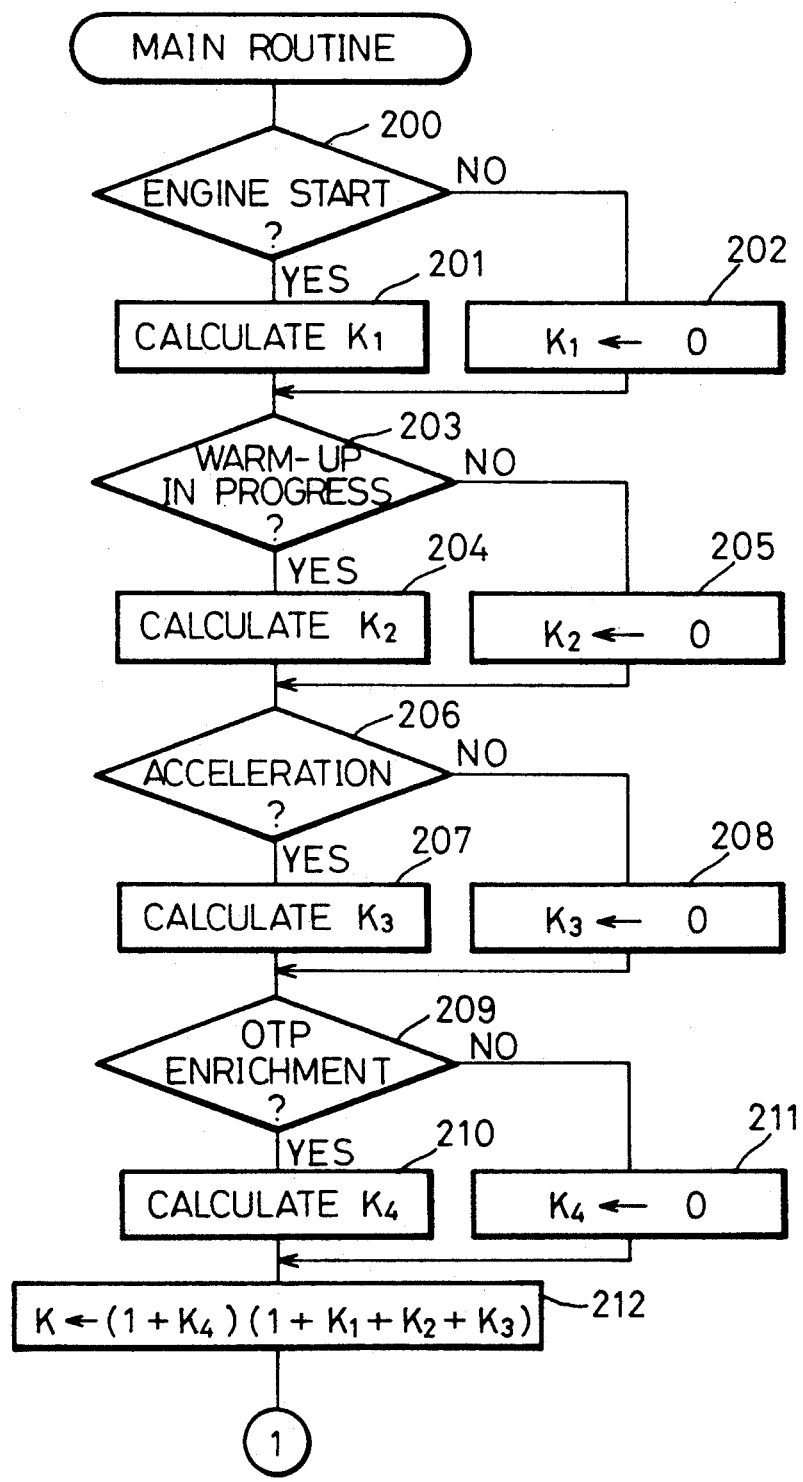
FIGS. 9A and 9B are a flow chart of a main routine.
Figure 9B:
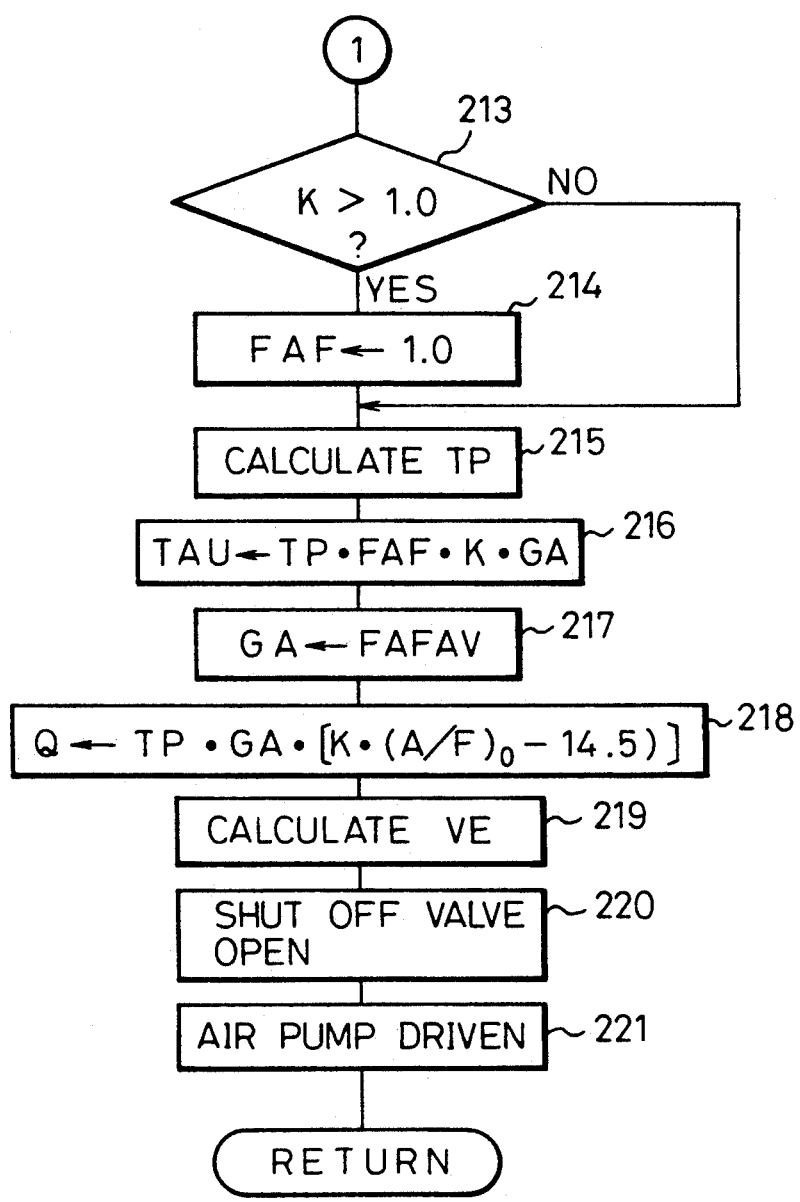

FIGS. 9A and 9B illustrate a main routine used where the engine illustrated in FIG. 8 is used; the back pressure PE is detected by the back pressure sensor 41; and the amount of secondary air is controlled so that the equivalent air-fuel ratio $(A/F)_0$ becomes equal to a predetermined air-fuel ratio on the lean side of the stoichiometric air-fuel ratio, for example, 15.0.

Referring to FIGS. 9A and 9B, in step 200, it is determined whether or not the engine is being started. If the engine is being started, the routine goes to step 201, and the start enrichment coefficient $K_1$ (>0) is calculated, and then the routine goes to step 203. conversely, if the engine is not being started, the routine goes to step 202 and the start enrichment coefficient $K_1$ is made zero, and then the routine goes to step 203.

In step 203, it is determined whether or not a warm-up of the engine is in progress. If the warm-up of the engine is in progress, the routine goes to step 204 and the warm-up enrichment coefficient $K_2$ (>0) is calculated, and then the routine goes to step 206. Conversely, if the warm-up of the engine is finished, the routine goes to step 205 and the warm-up enrichment coefficient $K_2$ is made zero, and then the routine goes to step 206.

In step 206, it is determined whether or not an acceleration of the engine is underway. If the acceleration of the engine is underway, the routine goes to step 207, and the acceleration enrichment coefficient $K_3$ (>0) is calculated, and then the routine goes to step 209. Conversely, if an acceleration of the engine is not underway, the routine goes to step 208 and the acceleration enrichment coefficient $K_3$ is made zero, and then the routine goes to step 209.

In step 209, it is determined whether or not OTP fuel amount increase operation is to be carried out. If the OTP fuel amount increase operation is to be carried out, the routine goes to step 210 and the OTP enrichment coefficient $K_4$ (>0) is calculated, and then the routine goes to step 212. Conversely, if the OTP fuel amount increase operation is not to be carried out, the routine goes to step 211 and the OTP enrichment coefficient $K_4$ is made zero, and then the routine goes to step 212.

In step 212, the enrichment coefficient K is calculated from the following formula.

$$K = (1+K_4)\cdot(1+K_1+K_2+K_3)$$

Then, in step 213, it is determined whether or not the enrichment coefficient K is larger than 1.0, i.e., the full amount increase operation is being carried out. If the fuel amount increase operation is being carried out, the routine goes to step 214 and the feedback correction coefficient FAF is made 1.0, i.e., is fixed, and then the routine goes to step 215. Accordingly, at this time, an open loop control of air-fuel ratio is carried out. Conversely, if it is determined in step 213 that the fuel amount increase operation is not being carried out, the routine jumps to step 215. Accordingly, at this time, a feedback control of air-fuel ratio based on the output signal of the $O_2$ sensor 38 is carried out, to maintain the air-fuel ratio at the stoichiometric air-fuel ratio.

In step 215, the basic fuel injection time TP is calculated based on the engine speed N and the output voltage of the pressure sensor 28. Then, in step 216, the fuel injection time TAU is calculated from the following formula.

$$TAU = TP \cdot FAF \cdot K \cdot GA$$

If the fuel injection time TAU is calculated, fuel is injected by the fuel injector 3 on the basis of the fuel injection time TAU. Then in step 217, the mean value FAFAV of the feedback correction coefficient FAF is made the learning coefficient GA, and then the routine goes to step 218.

In step 218, the amount of secondary air Q is calculated from the following formula.

$$Q = TP \cdot GA \cdot [K \cdot (A/F)_0 - 14.5]$$

In this case, where the target equivalent air-fuel ratio $(A/F)_0$ is, for example, 15.0, the amount of secondary air Q is represented as follows.

$$Q = TP \cdot GA \cdot (K \cdot 15.0 - 14.5)$$

Then, in step 219, the drive voltage VE for the air pump 13 is calculated from the map illustrated in FIG. 4, on the basis of the output voltage of the back pressure sensor 41. Then, in step 220, the shut-off valve 14 is opened, and in step 221, a signal representing the drive voltage VE is input to the voltage control circuit 35, and thus the air pump 13 is driven based on the drive voltage VE.

Figure 10:
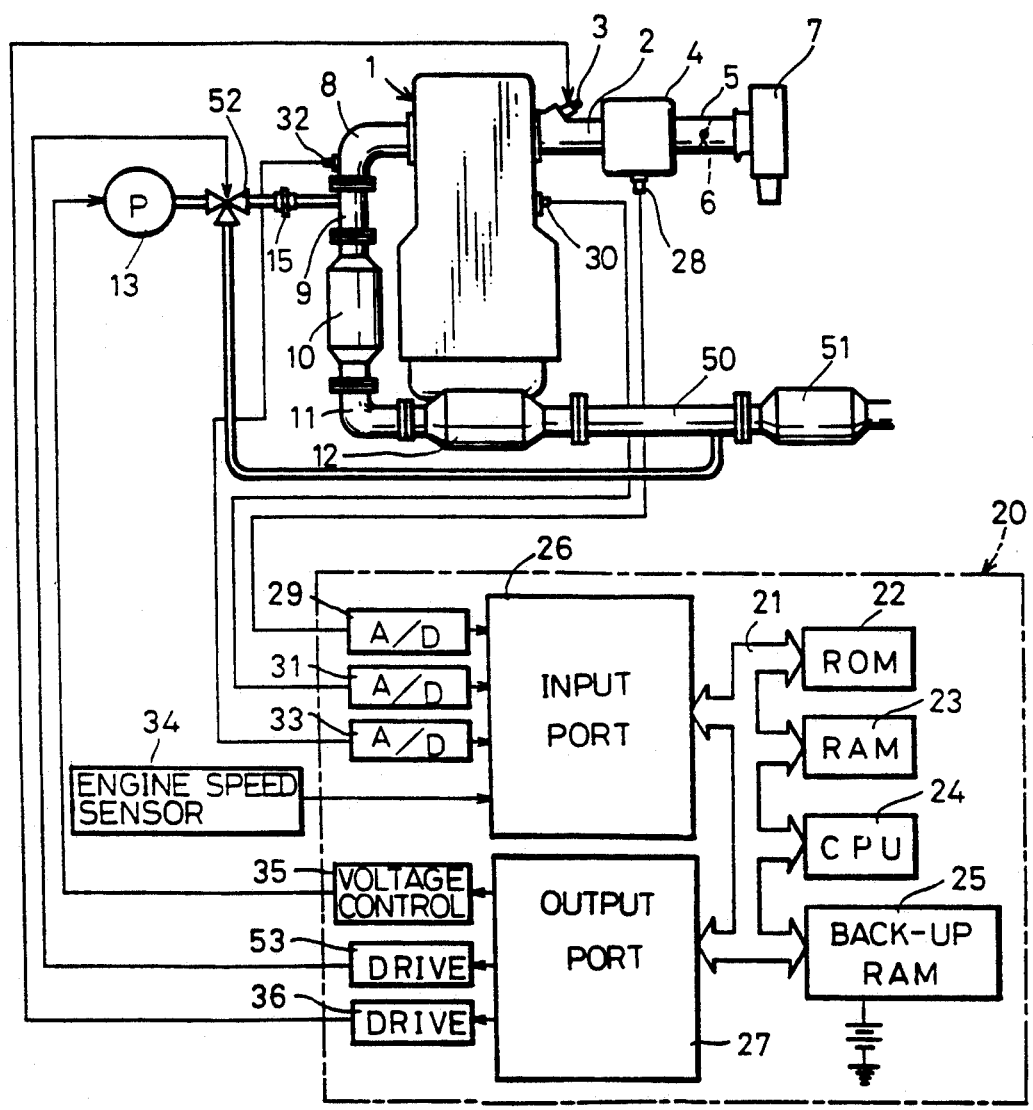
FIG. 10 is a general view of a third embodiment of an engine.

FIG. 10 illustrates a third embodiment of the present invention, wherein similar components are indicated by the same reference numerals used in FIG. 1. In this third embodiment, a three-way catalyzer is used as the catalyzers of the catalytic converters 10 and 12. Further, a third catalytic converter 51 is arranged downstream of the second catalytic converter 12 and connected to the second catalytic converter 12 via an exhaust pipe 50. An oxidizing catalyzer is used as a catalyzer of the third catalytic converter 51. Furthermore, in the third embodiment, the air pump 13 is connected to the exhaust pipe 9, and to the exhaust pipe 50, via a switching valve 52. This switching valve 52 takes three positions, i.e., a position at which the air pump 13 is completely disconnected from the exhaust pipes 9 and 50; a position at which the air pump 13 is connected to the exhaust pipe 9; and a position at which the air pump 13 is connected to the exhaust pipe 50.

When the temperature of the catalyzer is high, if the acceleration fuel amount increase operation or the OTP fuel amount increase operation is being carried out, and further, secondary air is being fed into the exhaust passage, the catalyzer might become overheated due to an oxidizing reaction heat. In the embodiment illustrated in FIG. 10, since exhaust gas having a high temperature is introduced into the first catalytic converter 10 and the second catalytic converter 12, the temperatures of the catalyzers of these catalytic converters 10 and 12 easily become high. Conversely, since exhaust gas having a lower temperature is introduced into the third catalytic converter 51, the catalyzer of the third catalytic converter 51 is maintained at a relatively low temperature. Accordingly in the third embodiment, when the acceleration fuel amount increase operation or the OTP fuel amount increase operation is being carried out, the secondary air is fed into the third catalytic converter 51 to prevent an overheating of the first catalytic converter 10 and the second catalytic converter 12, and to purify unburned HC and CO in the third catalytic converter 51.

Figure 11B:
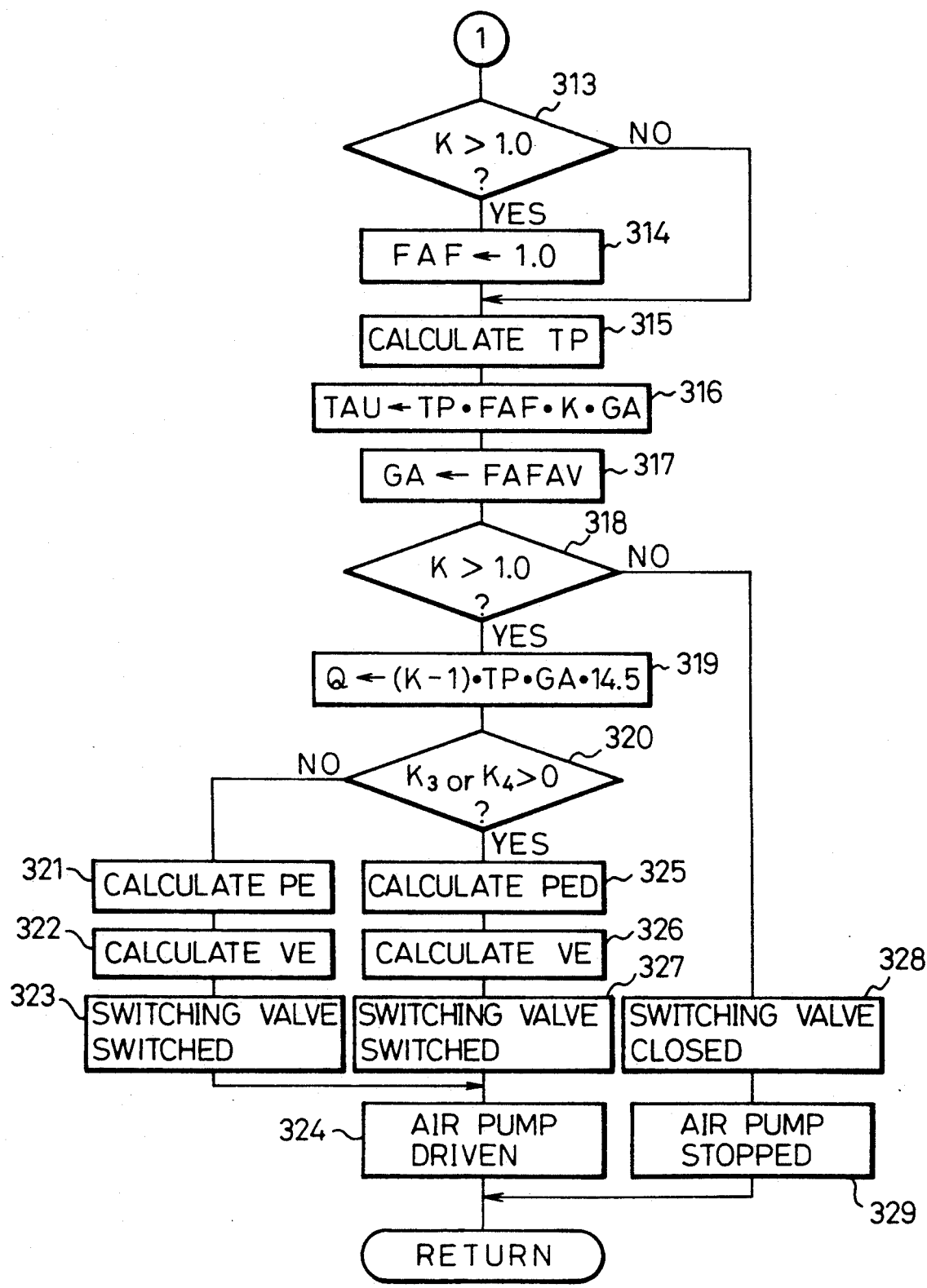
FIGS. 11A and 11B are a flow chart of a main routine.
Figure 11A:
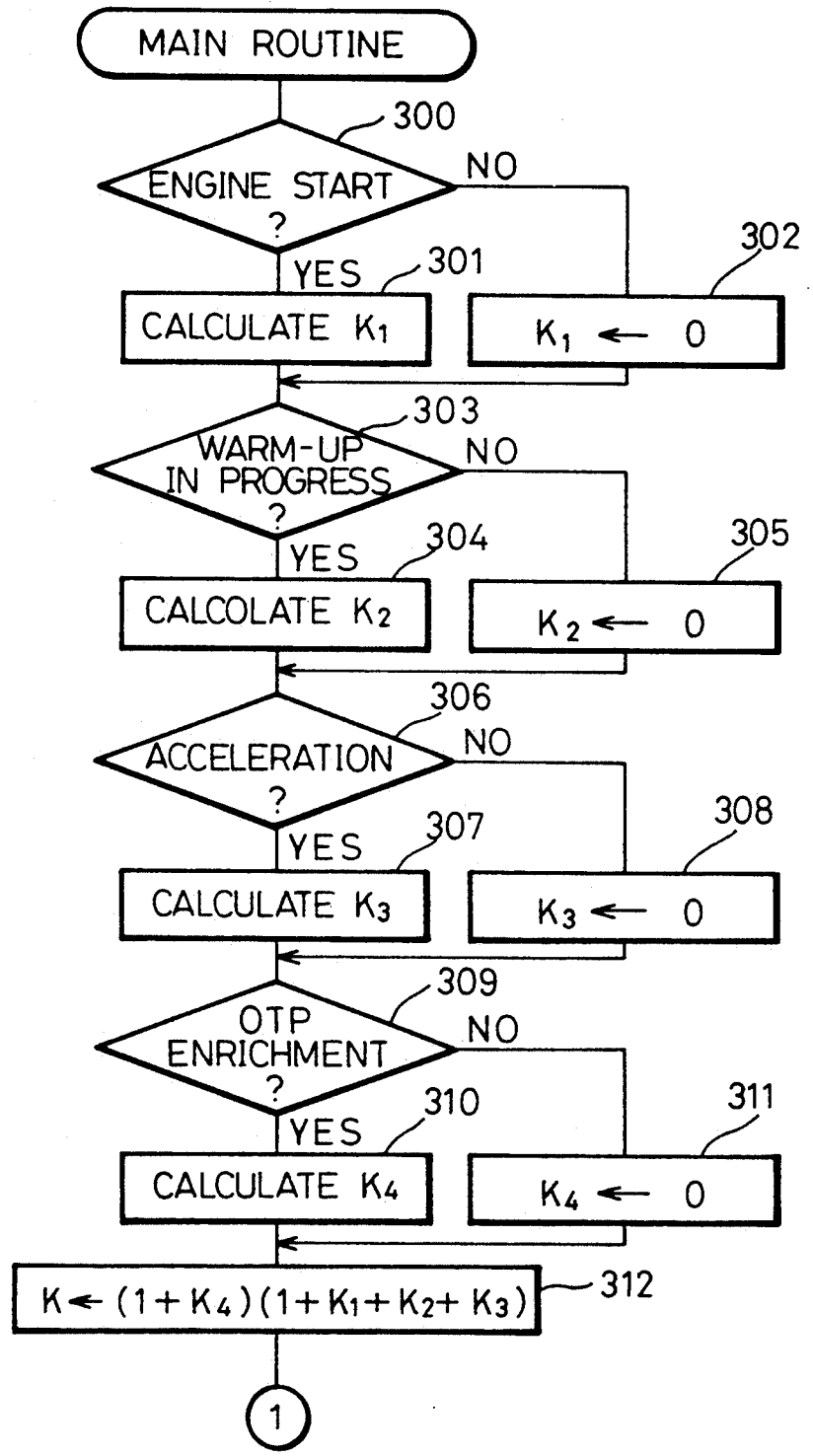

FIGS. 11A and 11B illustrate a main routine used where the engine illustrated in FIG. 10 is used; the back pressure PE is calculated from the map stored in the ROM 22; and the amount of secondary air is controlled so that the equivalent air-fuel ratio $(A/F)_0$ becomes equal to the stoichiometric air-fuel ratio when the fuel amount increase operation is being carried out.

Referring to FIGS. 11A and 11B, in step 300, it is determined whether or not the engine is being started. If the engine is being started, the routine goes to step 301 and the start enrichment coefficient $K_1$ (>0) is calculated, and then the routine goes to step 303. Conversely, if the engine is not being started, the routine goes to step 302 and the start enrichment coefficient $K_1$ is made zero, and then the routine goes to step 303.

In step 303, it is determined whether or not a warm-up of the engine is in progress. If the warm-up of the engine is in progress, the routine goes to step 304 and the warm-up enrichment coefficient $K_2$ (>0) is calculated, and then the routine goes to step 306. Conversely, if the warm-up of the engine is finished, the routine goes to step 305 and the warm-up enrichment coefficient $K_2$ is made zero and then the routine goes to step 306.

In step 306, it is determined whether or not an acceleration of the engine is underway. If an acceleration of the engine is underway, the routine goes to step 307 and the acceleration enrichment coefficient $K_3$ (>0) is calculated, and then the routine goes to step 309. Conversely, if an acceleration of the engine is not underway, the routine goes to step 308 and the acceleration enrichment coefficient $K_3$ is made zero, and then the routine goes to step 309.

In step 309, it is determined whether or not OTP fuel amount increase operation is to be carried out. If the OTP fuel amount increase operation is to be carried out, the routine goes to step 310 and the OTP enrichment coefficient $K_4$ (>0) is calculated, and then the routine goes to step 312. Conversely, if the OTP fuel amount increase operation is not to be carried out, the routine goes to step 311 and the OTP enrichment coefficient $K_4$ is made zero, and then the routine goes to step 312.

In step 312, the enrichment coefficient K is calculated from the following formula.

$$K = (1+K_4) \cdot (1+K_1+K_2+K_3)$$

Then, in step 313, it is determined whether or not the enrichment coefficient K is larger than 1.0, i.e., the fuel amount increase operation is being carried out. If the fuel amount increase operation is being carried out, the routine goes to step 314 and the feedback correction coefficient FAF is made 1.0, i.e., is fixed, and then the routine goes to step 315. Accordingly, at this time, an open loop control of air-fuel ratio is carried out. Conversely, if it is determined in step 313 that the fuel amount increase operation is not being carried out, the routine jumps to step 315. Accordingly, at this time, a feedback control of air-fuel ratio based on the output signal of the $O_2$ sensor 38 is carried out, to maintain the air-fuel ratio at the stoichiometric air-fuel ratio.

In step 315, the basic fuel injection time TP is calculated based on the engine speed N and the output voltage of the pressure sensor 28. Then, in step 316, the fuel injection time TAU is calculated from the following formula.

$$TAU = TP \cdot FAF \cdot K \cdot GA$$

If the fuel injection time TAU is calculated, fuel is injected by the fuel injector 3 on the basis of the fuel injection time TAU. Then, in step 317, the mean value FAFAV of the feedback correction coefficient FAF is made the learning coefficient GA, and then the routine goes to step 318.

In step 318, it is gain determined whether or not the enrichment coefficient K is larger than 1.0, i.e., the fuel amount increase operation is being carried out. If the fuel amount increase operation is being carried out, the routine goes to step 319 and the amount of secondary air Q is calculated from the following formula.

$$Q = (K-1) \cdot TP \cdot GA \cdot 14.5$$

Then, in step 320, it is determined whether or not $K_3$ or $K_4$ is positive, i.e., the acceleration fuel amount increase operation or the OTP fuel amount increase operation is being carried out. If the acceleration fuel amount increase operation and the OTP fuel amount increase operation are not being carried out, the routine goes to step 321 and the back pressure PE is calculated from the map illustrated in FIG. 6. Then, in step 322, the drive voltage VE for the air pump 13 is calculated from the map illustrated in FIG. 4. Then, in step 323, the switching valve 52 is switched so that the air pump 13 is connected to the exhaust pipe 9, and in step 324, a signal representing the drive voltage VE is input to the voltage control circuit 35, and thus the air pump 13 is driven based on the drive voltage VE.

Figure 12:
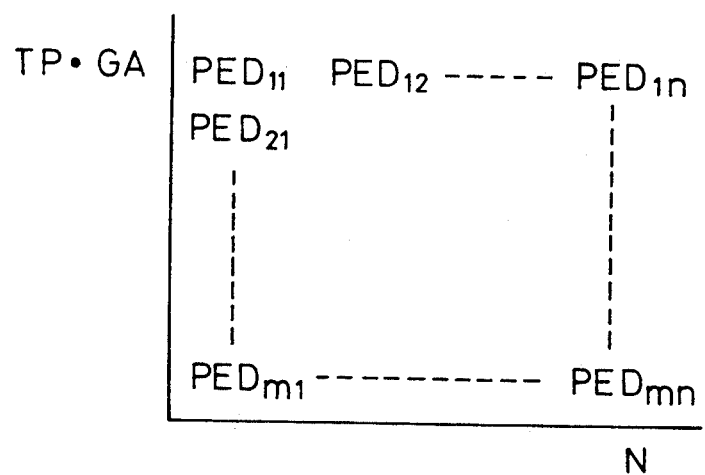
FIG. 12 is a view illustrating a map of the back pressure.

Conversely, if it is determined in step 320 that the acceleration fuel amount increase operation or the OTP fuel amount increase operation is being carried out, the routine goes to step 325 and the back pressure PED in the exhaust pipe 50 is calculated. This back pressure PED is memorized in advance in the ROM 22, as a function of the engine speed N and the amount of air TP·GA fed into the engine cylinder, as illustrated in FIG. 12. Then, in step 326, the drive voltage VE for the air pump 13 is calculated from the map illustrated in FIG. 4, and in step 327, the switching valve 52 is switched so that the air pump 13 is connected to the exhaust pipe 50, and then the routine goes to step 324. Accordingly, at this time, the secondary air is fed into the third catalytic converter 51.

If it is determined in step 318 that the fuel amount increase operation is not being carried out, the routine goes to step 328 and the switching valve 52 is switched to a closed position at which the air pump 13 is completely disconnected from the exhaust pipes 9 and 50. Then, in step 329, the air pump 13 is stopped.

Also, in this third embodiment, as in the second embodiment, when the fuel amount increase operation is being carried out, and when the feedback control of air-fuel ratio is being carried out, the secondary air is still fed into the exhaust pipe 50 upstream of the third catalytic converter 51. In this case, when the secondary air is to be fed into the exhaust pipe 50, the air pump 13 is connected to the exhaust pipe 50 via the switching valve 51. Further, if using the back pressure sensor as in the second embodiment, the back pressure sensor is connected to the exhaust pipe 50 and the main routine illustrated in FIGS. 9A and 9B is used to control the secondary air.

In all of the above embodiments, if the fuel injection time TAU is calculated, the fuel is injected by the fuel injector 3 on the basis of the fuel injection time TAU. Further, the amount of secondary air Q is calculated on the basis of the fuel injection time TAU, and the drive voltage VE for the air pump 13 is controlled based on this amount of secondary air Q. In this case, the injected fuel is discharged into the exhaust passage in the form of an exhaust gas, after an elapse of time, and the amount of secondary air actually fed into the exhaust passage is also changed after an elapse of time from when the drive voltage VE for the air pump 13 is controlled. Accordingly, since both delay times are cancelled, the equivalent air-fuel ratio $(A/F)_0$ is correctly maintained at a predetermined air-fuel ratio. Namely, by carrying out the feedback control for the supply of secondary air, a desired purifying operation of the exhaust gas can be obtained.

According to the present invention, it is possible to make the equivalent air-fuel ratio in the exhaust passage correctly equal to a predetermined air-fuel ratio, without using an $O_2$ sensor for controlling the secondary air.

Although the invention has been described with reference to specific embodiments chosen for purposes of illustration, it should be apparent that numerous modifications could be made thereto by those skilled in the art without departing from the basic concept and scope of the invention.

I claim:

1. A device for controlling the operation of an engine having an exhaust passage, said device comprising:
    fuel amount calculating means for calculating an amount of fuel to be fed into the engine in accordance with an operating state of the engine;
    fuel supply means for feeding fuel into the engine by an amount calculated by said fuel amount calculating means;
    secondary air supply means for feeding secondary air into the exhaust passage;
    secondary air amount calculating means for calculating an amount of secondary air on the basis of an amount of fuel calculated by said fuel amount calculating means, to find an amount of secondary air necessary to obtain a predetermined desired equivalent air-fuel ratio on the leaner side of an air-fuel ratio determined by said calculated amount of fuel; and
    control means for controlling said secondary air supply means in response to said necessary amount of secondary air found by said secondary air amount calculating means to make the amount of secondary air fed into the exhaust passage equal to said necessary amount of secondary air.

2. A device according to claim 1, wherein said fuel amount calculating means comprises an air-fuel ratio detecting means arranged in the exhaust passage for detecting an equivalent air-fuel ratio, and an air-fuel ratio control means for carrying out a feedback control of the amount of fuel to be fed into the engine in response to a signal output from said air-fuel ratio detecting means to make the equivalent air-fuel ratio equal to a predetermined target air-fuel ratio when the engine is operating under a predetermined first operating state, said air-fuel ratio control means stopping the feedback control of the amount of fuel to the fed into the engine and carrying out an open loop control of the amount of fuel to be fed into the engine when the engine is operating under a predetermined second operating state, said secondary air amount calculating means finding said necessary amount of secondary air on the basis of said desired equivalent air-fuel ratio, said target air-fuel ratio and the amount of fuel to be fed into the engine.

3. A device according to claim 2, wherein the amount of fuel TAU to be fed into the engine is calculated from the following formula:

$$TAU = TP \cdot FAF \cdot K \cdot GA$$

where:
    TP is a basic fuel injection amount memorized in a memory in advance.
    FAF is a feedback correction coefficient for making an air-fuel ratio equal to said target air-fuel ratio on the basis of the signal output from said air-fuel ratio detecting means;
    K is an enrichment coefficient for increasing the amount of fuel when the engine is operating under said second operating state; and
    GA is a learning coefficient for maintaining the feedback correction coefficient FAF at a reference value.

4. A device according to claim 3, wherein said air-fuel control means maintains said feedback correction coefficient FAF at said reference value when the open loop control of the amount of fuel to be fed into the engine is carried out.

5. A device according to claim 3, wherein said necessary amount of secondary air Q is represented by the following formula:

$$Q = TP \cdot K \cdot GA \cdot (A/F)_0 - TP \cdot GA \cdot (A/F)_t$$

where:
    $(A/F)_0$ is said desired equivalent air-fuel ratio; and
    $(A/F)_t$ is said target air-fuel ratio.

6. A device according to claim 5, wherein said desired equivalent air-fuel ratio $(A/F)_0$ and said target air-fuel ratio are a stoichiometric air-fuel ratio, and said necessary amount of secondary air Q is represented by the following formula:

$$Q = TP \cdot (K-1) \cdot GA \cdot 14.5$$

7. A device according to claim 6, where a three way catalyzer is arranged in the exhaust passage, and the secondary air is fed into the exhaust passage upstream of said three way catalyzer.

8. A device according to claim 6, wherein a three way catalyzer is arranged in the exhaust passage, and an oxidizing catalyzer is arranged in the exhaust passage downstream of said three way catalyzer, the secondary air being fed into the exhaust passage upstream of said three way catalyzer and between said three way catalyzer and said oxidizing catalyzer.

9. A device according to claim 8, wherein said enrichment coefficient K comprises a start enrichment coefficient, a warm-up enrichment coefficient, an acceleration enrichment coefficient and an OTP enrichment coefficient, and the secondary air is fed into the exhaust passage upstream of said three way catalyzer when the amount of fuel to be fed into the engine is increased by either one of the start enrichment coefficient and the warm-up enrichment coefficient, the secondary air being fed into the exhaust passage between said three way catalyzer and said oxidizing catalyzer when the amount of fuel to be fed into the engine is increased by either one of the acceleration enrichment coefficient and the OTP enrichment coefficient.

10. A device according to claim 5, wherein said target air-fuel ratio is a stoichiometric air-fuel ratio, and said desired equivalent air-fuel ratio is an air-fuel ratio on the lean side of the stoichiometric air-fuel ratio, said necessary amount of secondary air Q being represented by the following formula:

$$Q = TP \cdot GA \cdot [K \cdot (A/F)_0 - 14.5]$$

11. A device according to claim 10, wherein an oxidizing catalyzer is arranged in the exhaust passage, and the secondary air is fed into the exhaust passage upstream of said oxidizing catalyzer.

12. A device according to claim 10, wherein said desired equivalent air-fuel ratio is about 15.0.

13. A device according to claim 1, wherein said secondary air supply means comprises an electrically operated air pump, and said control means controls a drive voltage applied to said air pump to make the amount of secondary air fed into the exhaust passage from said air pump equal to said necessary amount of secondary air.

14. A device according to claim 13, wherein said drive voltage is a function of a back pressure in the exhaust passage and said necessary amount of secondary air found by said secondary air amount calculating means, and said control means controls said drive voltage on the basis of said back pressure and said necessary amount of secondary air.

15. A device according to claim 14, wherein said control means finds said back pressure on the basis of an engine speed and an amount of air fed into the engine and controls said drive voltage on the basis of said necessary amount of secondary air and said back pressure found by said control means.

16. A device according to claim 14, wherein a back pressure sensor is arranged in the exhaust passage, and said control means controls said drive voltage on the basis of said necessary amount of secondary air and said back pressure detected by said back pressure sensor.

* * * * *